(12) United States Patent
Inoue et al.

(10) Patent No.: US 9,797,464 B2
(45) Date of Patent: Oct. 24, 2017

(54) DISK BRAKE

(71) Applicant: HITACHI AUTOMOTIVE SYSTEMS, LTD., Ibaraki (JP)

(72) Inventors: Hayuru Inoue, Kawasaki (JP); Daisuke Tanabe, Kawasaki (JP); Yoichi Kumemura, Kawasaki (JP); Seiko Tanabe, Kawasaki (JP); Hitoshi Yoshida, Kawasaki (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 14/894,433

(22) PCT Filed: Apr. 30, 2014

(86) PCT No.: PCT/JP2014/061992
§ 371 (c)(1),
(2) Date: Nov. 27, 2015

(87) PCT Pub. No.: WO2014/192495
PCT Pub. Date: Dec. 4, 2014

(65) Prior Publication Data
US 2016/0116011 A1 Apr. 28, 2016

(30) Foreign Application Priority Data
May 31, 2013 (JP) .................. 2013-116366

(51) Int. Cl.
*F16D 65/097* (2006.01)
*F16D 66/02* (2006.01)

(52) U.S. Cl.
CPC ......... *F16D 66/02* (2013.01); *F16D 65/0972* (2013.01); *F16D 65/097* (2013.01); *F16D 65/0977* (2013.01); *F16D 65/0979* (2013.01)

(58) Field of Classification Search
CPC ............... F16D 65/097; F16D 65/0972; F16D 65/0977; F16D 65/0979; F16D 66/02
(Continued)

(56) References Cited

U.S. PATENT DOCUMENTS 3,977,499 A    8/1976  Johannesen
4,460,067 A *  7/1984  Katagiri .................. F16D 66/02
                                                 188/1.11 W
(Continued)

FOREIGN PATENT DOCUMENTS

JP    51-19277    2/1976
JP    57-140934   8/1982
(Continued)

OTHER PUBLICATIONS

International Search Report dated Aug. 5, 2014 in International Application No. PCT/JP2014/061992.

*Primary Examiner* — Thomas Irvin
(74) *Attorney, Agent, or Firm* — Wenderoth, Lind & Ponack, L.L.P.

(57) ABSTRACT

An urging spring (15) urges a friction pad toward the exit side of the rotational direction of a disk when a vehicle equipped with the disk brake runs forward. The urging spring is disposed between a lug portion (11A) of the friction pad and a torque receiving surface (5) of a carrier (2). The distal end of the urging spring is configured to abut against the disk to perform wear detection. The urging spring includes a mounting portion (15A), a first extending portion (15B), a boundary region (15E), a bent portion (15C), and a second extending portion (15D). The boundary region is reduced in width to lower stiffness. The bent portion is increased in width and provided with reinforcing portions, thereby enhancing the stiffness. Thus, the natural frequen-
(Continued)

cies of the second extending portion in the rotational direction K and the vertical direction J come close to each other.

5 Claims, 9 Drawing Sheets (58) Field of Classification Search
USPC .............................. 188/1.11 W, 73.36, 73.38
See application file for complete search history.

(56) References Cited

U.S. PATENT DOCUMENTS

| | | | | |
|---|---|---|---|---|
| 5,033,590 A | * | 7/1991 | Kobayashi | F16D 66/02 188/1.11 W |
| 5,687,817 A | * | 11/1997 | Kobayashi | F16D 65/097 188/72.3 |
| 5,934,417 A | * | 8/1999 | Kobayashi | F16D 55/227 188/1.11 W |
| 5,947,233 A | * | 9/1999 | Kobayashi | F16D 55/227 188/1.11 W |
| 7,040,464 B1 | * | 5/2006 | Andrews | F16D 65/0978 188/73.38 |
| 7,318,503 B2 | * | 1/2008 | Farooq | F16D 65/0974 188/205 A |
| 7,455,153 B2 | * | 11/2008 | Ooshima | F16D 65/0972 188/18 A |
| 8,540,060 B2 | * | 9/2013 | Hayashi | F16D 65/097 188/1.11 W |
| 9,388,869 B2 | * | 7/2016 | Zhang | F16D 65/0972 |
| 2010/0187050 A1 | * | 7/2010 | Hayashi | F16D 65/097 188/72.3 |
| 2011/0056778 A1 | * | 3/2011 | Roth | F16D 65/0973 188/234 |
| 2015/0247542 A1 | * | 9/2015 | Yukumi | F16D 65/0977 188/72.3 |

FOREIGN PATENT DOCUMENTS

| | | |
|---|---|---|
| JP | 5-52381 | 7/1993 |
| JP | 10-331883 | 12/1998 |
| JP | 2012-211664 | 11/2012 |
| WO | 2014/192495 | 12/2014 |

* cited by examiner

DISK BRAKE

TECHNICAL FIELD

The present invention relates to disk brakes applying braking force to a vehicle, for example, an automobile.

BACKGROUND ART

As a disk brake provided in a vehicle, e.g. an automobile, there has been generally known a disk brake which comprises a mounting member secured to a non-rotating part of a vehicle, a pair of friction pads supported by the mounting member and pressed against both sides, respectively, of a disk in response to the supply of hydraulic pressure to a caliper, and an urging spring (what is called an anti-rattle spring) provided between each of the friction pads and the mounting member to urge the associated friction pad toward the exit side of the rotational direction (circumferential direction) of the disk when the vehicle runs forward, and in which the urging spring is configured to have a function of detecting a wear condition of the friction pad (for example, see Patent Literature 1).

CITATION LIST

Patent Literature

Patent Literature 1: Japanese Patent Application laid-Open Publication No. Hei 10-331883

SUMMARY OF INVENTION

Technical Problem

Incidentally, the disk brake with an urging spring as employed in the above-described conventional technique suffers from the problem that it is impossible to sufficiently obtain a wear detection sound, which is generated according to a wear condition of the friction pad.

The present invention has been made in view of the above-described problem with the conventional technique, and an object of the present invention is to provide a disk brake capable of sufficiently obtaining a wear detection sound.

Solution to Problem

To solve the above-described problem, the present invention provides a disk brake including a mounting member secured to a vehicle, extending over a disk, the mounting member having torque receiving surfaces receiving torque during a braking operation, the mounting member having a caliper slidably provided thereon to press friction pads against the disk, the friction pads being provided to face both sides, respectively, of the disk. The friction pads each have a backing plate supported by the mounting member at both sides thereof in a circumferential direction of the disk, the backing plate having torque transmission portions on side portions thereof that abut against the torque receiving surfaces, respectively, of the mounting member, the friction pads each further having a friction material fixed to one surface side of the backing plate, the friction material being abuttable against the disk to generate frictional force, and an urging device urging the friction pad toward the exit side of the rotational direction of the disk. The urging device has a mounting portion secured to the backing plate, a first extending portion connected at the proximal end thereof to the mounting portion and extended away from the disk, a bent portion formed at the distal end of the first extending portion arcuately away from the disk and bent so that the distal end of the bent portion faces toward the disk, and a second extending portion extending from the distal end of the bent portion toward the disk and resiliently abutting against the mounting member in an elastically deformed state. The distal end of the second extending portion abuts against the disk when the friction material has worn by a predetermined amount, and the bent portion is set higher in stiffness than a first boundary region between the first extending portion and the bent portion.

Advantageous Effects of Invention

As has been stated above, it is possible according to the present invention to provide a disk brake capable of sufficiently obtaining a wear detection sound, which is generated according to a wear condition of the friction pad.

DESCRIPTION OF EMBODIMENTS

A disk brake according to an embodiment of the present invention will be explained below in detail with reference to the accompanying drawings.

In the drawings, reference numeral 1 denotes a rotating disk. The disk 1 rotates together with a wheel (not shown) of a vehicle. For example, when the vehicle runs in the forward direction, the disk 1 rotates in the direction of the arrow A in FIG. 1, and when the vehicle reverses, the disk 1 rotates in the direction of the arrow B in FIG. 1.

Figure 1:
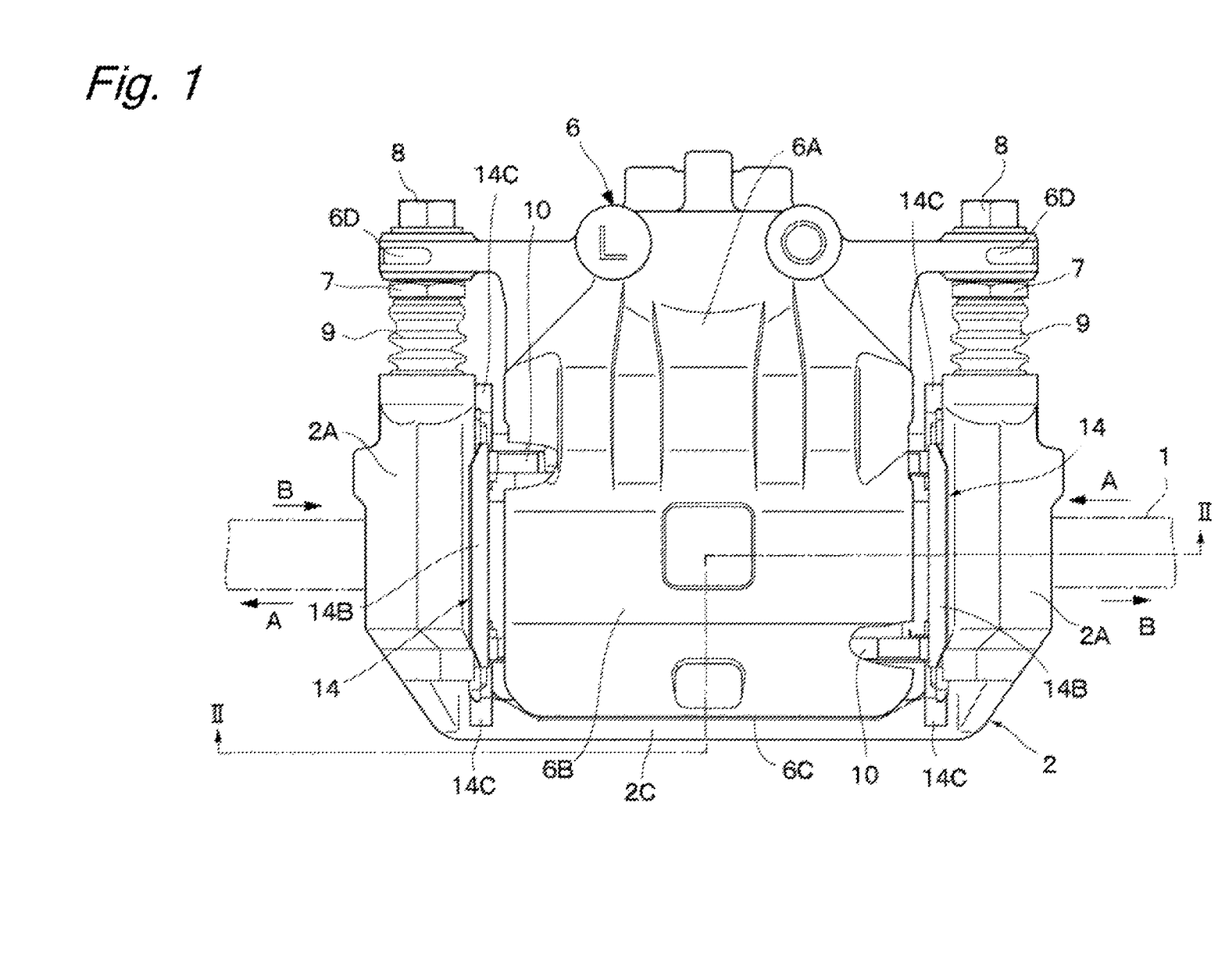
FIG. 1 is a top plan view of a disk brake according to an embodiment of the present invention.
Figure 2:
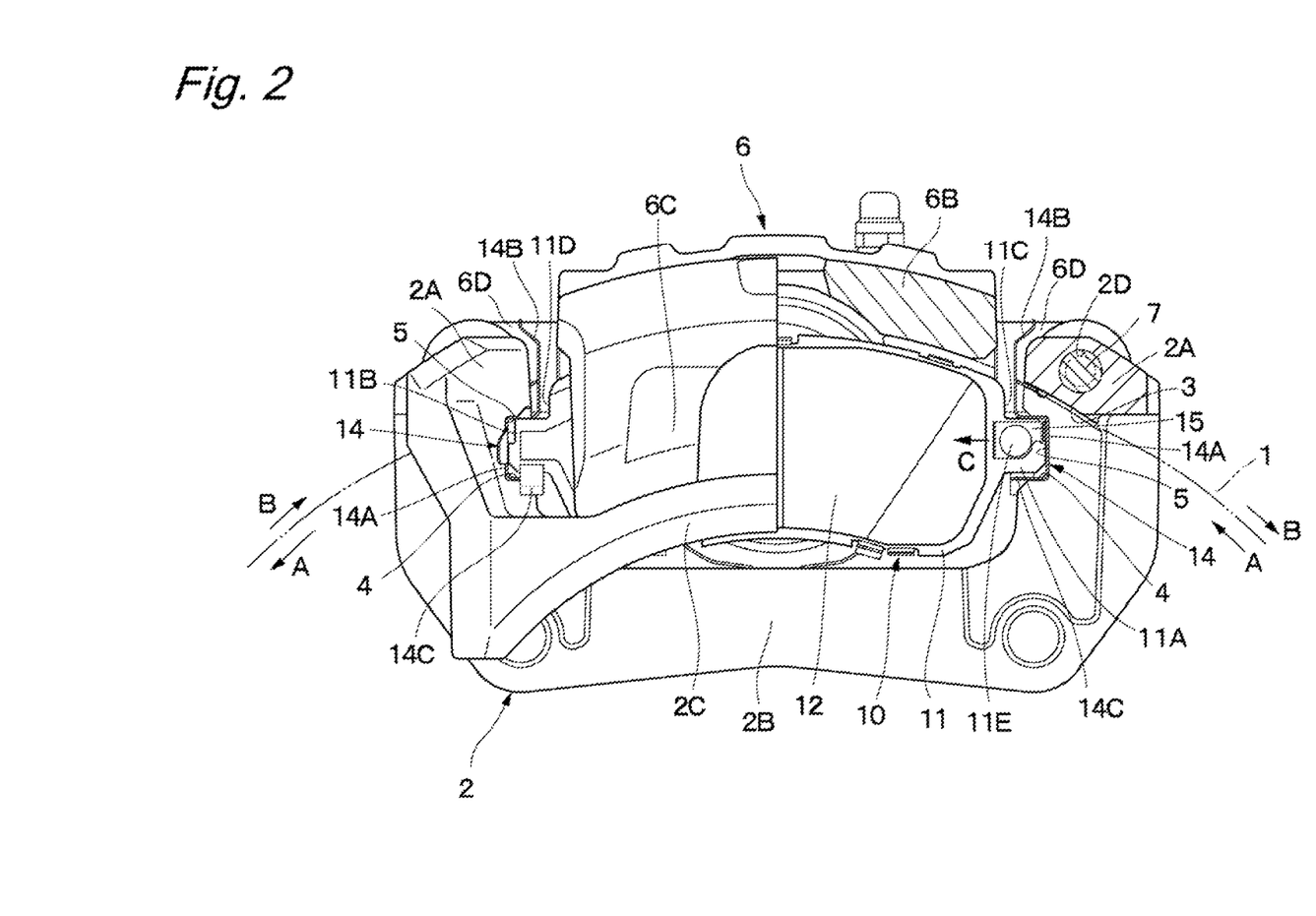
FIG. 2 is a partly-cutaway front view of the disk brake as seen from the direction of the arrow II-II in FIG. 1.
Figure 3:
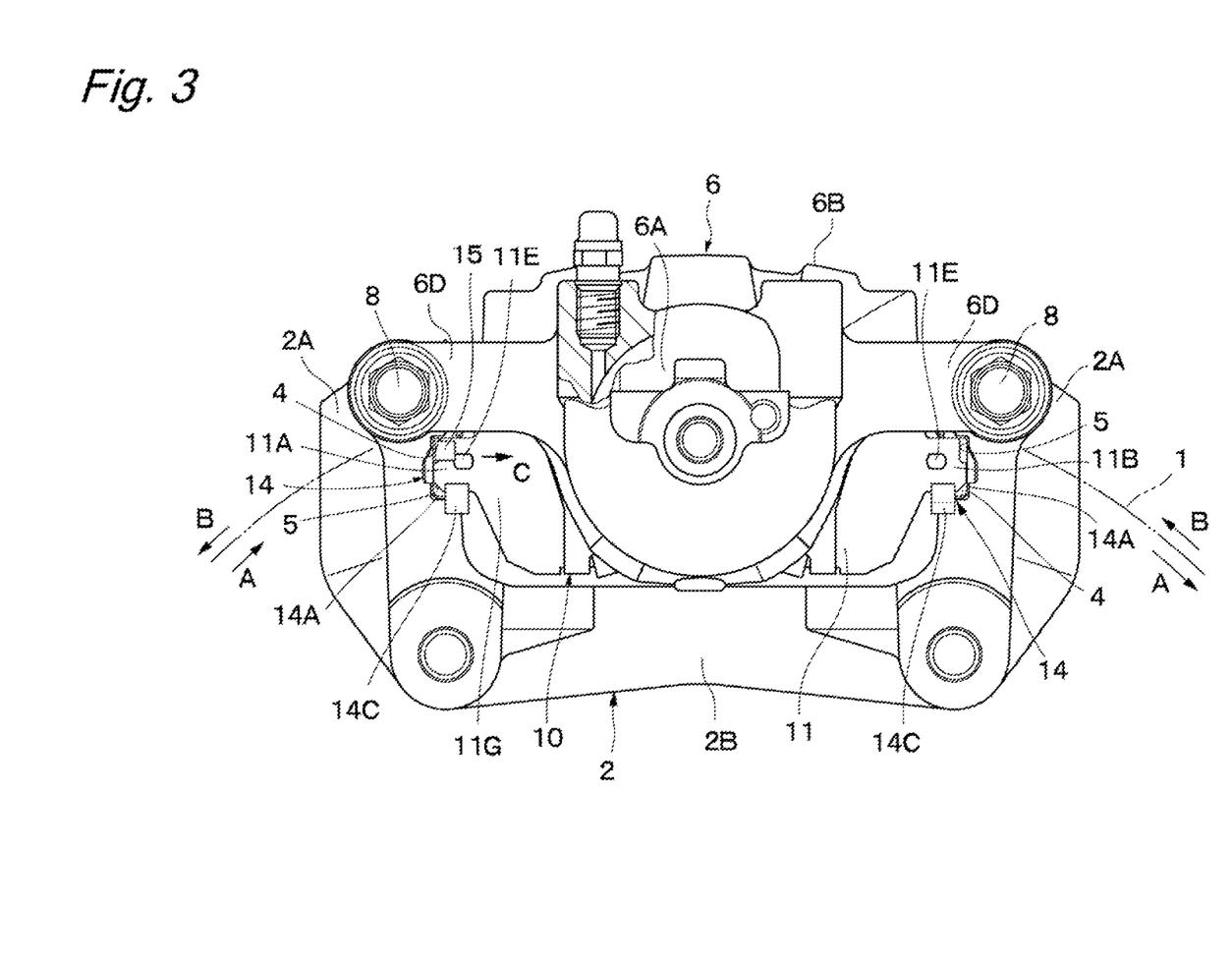
FIG. 3 is a rear view of the disk brake shown in FIG. 2.
Figure 4:
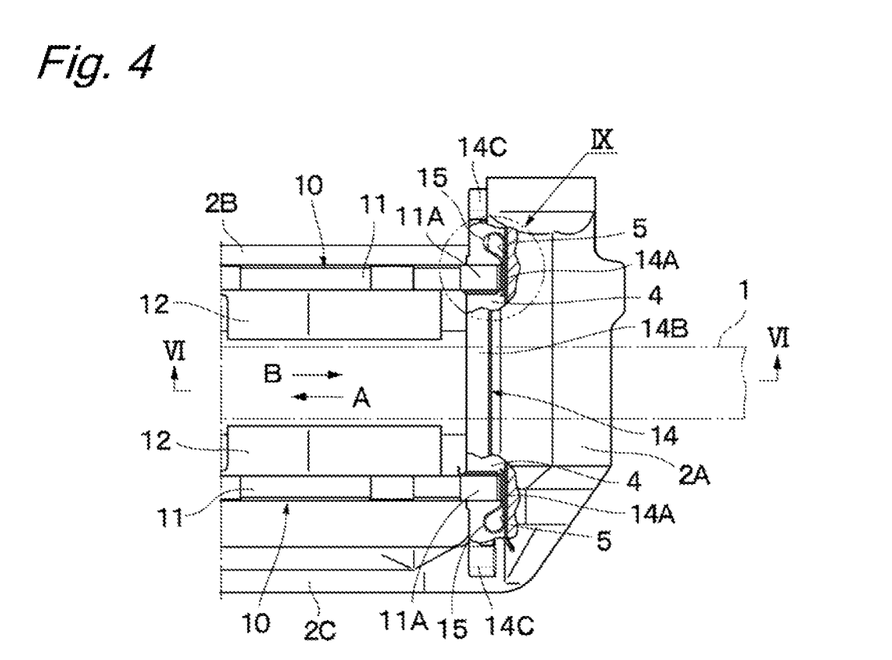
FIG. 4 is a partly-cutaway plan view showing a mounting member, friction pads, pad springs, urging springs, etc., with a caliper in FIG. 1 removed.

Reference numeral 2 denotes a carrier serving as a mounting member secured to a non-rotating part of the vehicle. The carrier 2 comprises, as shown in FIGS. 1 to 3, a pair of arms 2A spaced apart from each other in the rotational (circumferential) direction of the disk 1 and extending over the outer periphery of the disk 1 in the axial direction of the disk 1. The carrier 2 further comprises a thick-walled support portion 2B provided to integrally connect together the proximal ends of the arms 2A and secured to the non-rotating part of the vehicle at a position that is at the inner side of the disk 1.

Further, the carrier 2 is integrally formed with a bow-shaped reinforcing beam 2C, as shown in FIG. 2, which connects together the distal ends of the arms 2A at a position that is at the outer side of the disk 1. Thus, the arms 2A of the carrier 2 are integrally connected together by the support portion 2B at the inner side of the dish 1, and at the outer side of the disk 1, the arms 2A are integrally connected together by the reinforcing beam 2C.

Figure 6:
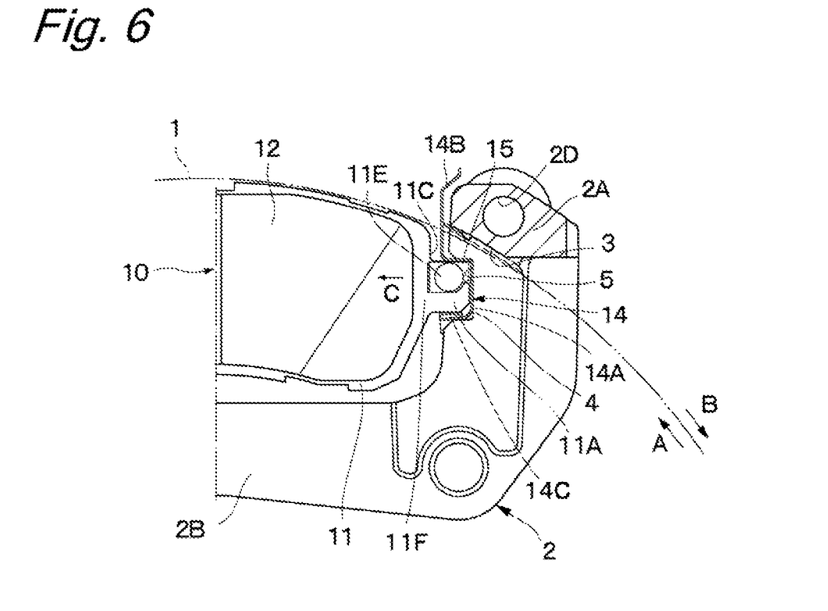
FIG. 6 is a sectional view of the mounting member, one friction pad, one pad spring, one urging spring, etc. as seen from the direction of the arrow VI-VI in FIG. 4.

Each arm 2A has, as shown in FIGS. 2 and 6, a dish pass portion 3 at the middle thereof in the axial direction of the disk 1. The disk pass portion 3 extends arcuately along the outer periphery (locus of rotation) of the disk 1. The disk pass portion 3 has inner and outer pad guides 4 formed at both sides thereof in the axial direction of the disk 1. The arms 2A are provided with pin holes 2D, respectively, as shown in FIGS. 2 and 6. The pin holes 2D have sliding pins 7 (described later) slidably fitted therein, respectively.

As shown in FIGS. 2 to 6, the pad guides 4 are formed as U-grooves having a rectangular configuration conforming to the configuration of a lug portion 11A of a friction pad 10 (described later), and extend in the axial direction of the disk 1, i.e. in a direction in which the friction pad 10 (described later) is slidingly displaced. It should be noted that the groove configuration does not need to be a complete rectangle.

The pad guides 4 are fitted with lug portions 11A and 11B of each friction pad 10 (described later) in such a manner as to sandwich the lug portions 11A and 11B, respectively, from above and below (in the disk radial direction). That is, the lug portions 11A and 11B are recess-projection fitted in the pad guides 4. The pad guides 4 guide the friction pad 10 in the disk axial direction through the lug portions 11A and 11B, respectively. The respective inner wall surfaces of the pad guides 4 constitute torque receiving surfaces 5, which are torque receiving portions. The torque receiving surfaces 5 receive braking torque generated during a braking operation through the lug portions 11A and 11B of the friction pad 10.

More specifically, of the left and right pad guides 4 shown in FIG. 2, the left-side pad guide 4 is located at the exit side of the rotational direction of the disk 1 as rotating in the direction, of the arrow A (this side will hereinafter be referred to as "rotation exit side"). The left-side pad guide 4, particularly the bottom-side torque receiving surface 5 thereof, receives braking torque that the friction pad 10 (described later) receives from the disk 1 during a braking operation through the lug portion 11B of a backing plate 11 and a guide place portion 14A of a pad spring 14 (described later). On the other hand, the bottom side, i.e. the torque receiving surface 5, of the pad guide 4 located at the entrance side of the rotational direction of the disk 1 as rotating in the direction of the arrow A (this side will hereinafter be referred to as "rotation entrance side") is slightly separate from the lug portion 11A of the friction pad 10 during a braking operation.

A caliper 6 is slidably provided on the carrier 2. As shown in FIG. 1, the caliper 6 has an inner leg portion 6A provided at one side (inner side) of the disk 1, a bridge portion 6B extending from the inner leg portion 6A to the other side (outer side) of the disk 1 over the outer periphery of the disk 1 between the arms 2A of the carrier 2, and an outer leg portion 6C extending radially inward of the disk 1 from the distal (outer) end of the bridge portion 6B and bifurcated, at the distal end thereof.

The inner leg portion 6A of the caliper 6 is formed with a cylinder (not shown) in which a piston (not shown) is slidably fitted. Further, the inner leg portion 6A is provided with a pair of mounting portions 6D projecting leftward and rightward, respectively, in FIGS. 1 and 3. The mounting portions 6D allow the whole caliper 6 to be slidably supported by the arms 2A of the carrier 2 through respective sliding pins 7 (described later).

The sliding pins 7 are, as shown in FIG. 1, fastened to the mounting portions 6D of the caliper 6 by using bolts 8, respectively. The distal ends of the sliding pins 7 extend toward the respective pin holes 2D of the arms 2A of the carrier 2, and, as illustrated in FIG. 2, are slidably fitted in the pin holes 2D of the carrier 2.

Protective boots 9 are provided between the arms 2A and the sliding pins 7, respectively, to prevent rainwater or the like from entering between the sliding pins 7 and the pin holes 2D of the arms 2A.

The friction pads 10 are disposed to face both sides, respectively, of the disk 1. Each friction pad 10 comprises, as shown in FIGS. 1 to 6, a flat plate-shaped backing plate 11 extending substantially in a fan shape along the circumferential (rotational) direction of the disk 1, and a lining 12 fixed to the obverse surface side of the backing plate 11 to serve as a friction material coming in frictional contact with the obverse surface of the disk 1.

The backing plate 11 of each friction pad 10 has projection-shaped lug portions 11A and 11B provided on the opposite sides thereof in the circumferential direction of the disk 1 to serve as fitting portions, respectively. The lug portions 11A and 11B of the backing plate 11 constitute torque transmission portions that abut against the torque receiving surfaces 5, respectively, of the carrier 2 to transmit thereto braking torque that the friction pad 10 receives from the disk 1 during braking of the vehicle.

The lug portions 11A and 11B of the friction pad 10 (backing plate 11) are formed in bilateral symmetry with the same shape, as shown for example in FIGS. 2 and 3. One lug portion 11A is disposed at the entrance side (rotation entrance side) of the rotational direction of the disk 1, which rotates in the direction of the arrow A when the vehicle runs forward, and the other lug portion 11B is disposed at the exit side (rotation exit side) of the rotational direction of the disk 1.

Of the right and left lug portions 11A and 11B of the friction pad 10, which serve as torque transmission portions, the lug portion 11A, which is located at the rotation entrance side of the disk 1, is provided with an urging spring 15.

The backing plate 11 of the friction pad 10 has flat surface portions 11C and 11D respectively formed on side surfaces thereof at the longitudinal opposite sides of the backing plate 11, i.e. at the rotation entrance and exit sides of the disk 1. The flat surface portions 11C and 11D extend radially outward of the disk 1 in respective directions substantially perpendicular to the projecting directions of the lug portions 11A and 11B.

Figure 7:
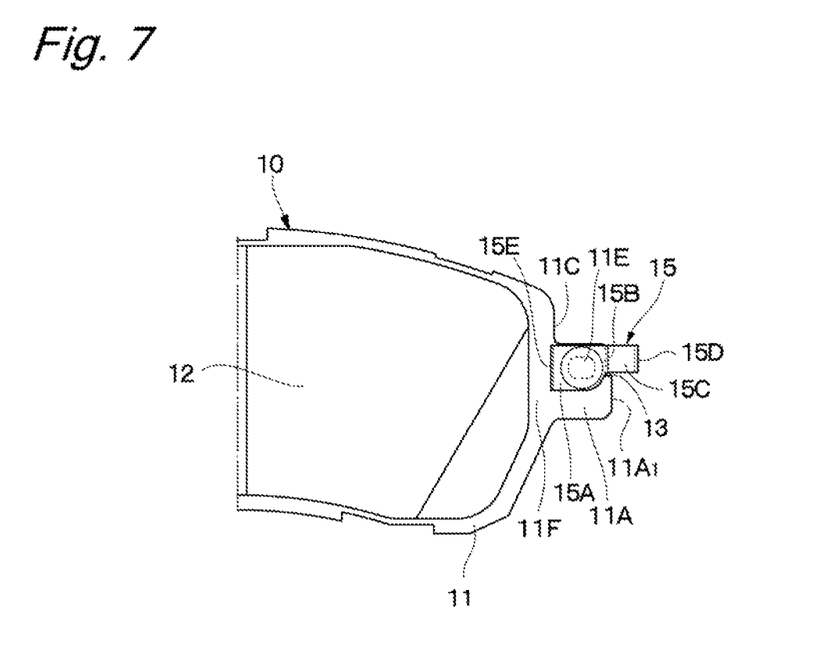
FIG. 7 is a front view showing the friction pad in FIG. 6 as having the associated urging spring attached thereto.
Figure 8:
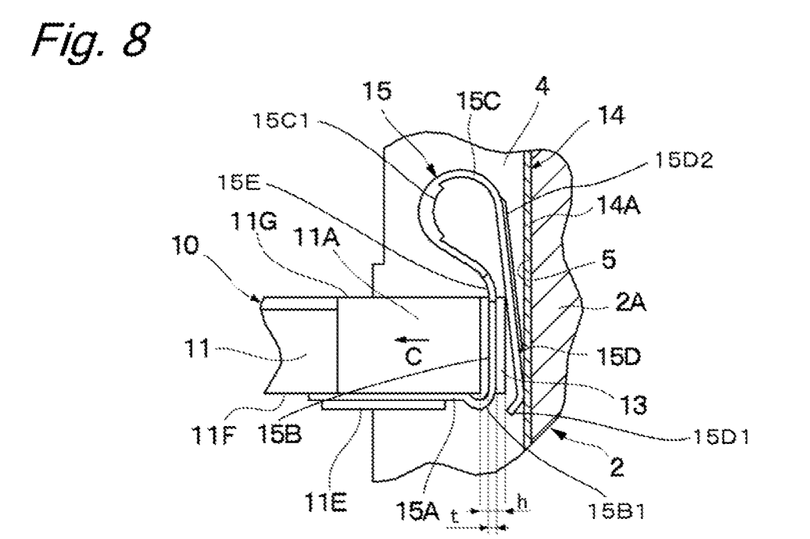
FIG. 8 is a fragmentary enlarged sectional view of a part indicated by the arrow IX in FIG. 4.

The backing plate 11 of the friction pad 10 has caulked portions 11E provided at respective positions closer to the proximal ends (roots) of the lug portions 11A and 11B. The caulked portions 11E are, as shown in FIGS. 7 and 8, provided to project from one surface (hereinafter referred to as "an obverse surface 11F") side of the backing plate 11 where the lining 12 is provided. Of the caulked portions 11E, the one 11E that is located at the rotation entrance side of the disk 1 is caulked to secure an urging spring 15 (described later) to the backing plate 11 of the friction pad 10.

The lug portion 11A of the backing plate 11 is provided with a U-groove 13. The U-groove 13 is, as shown in FIGS. 7 and 8, formed by partly cutting in an L-shape an end face at the distal end side (projecting end side) of the lug portion 11A to constitute an accommodating groove for accommodating a part of an urging spring 15 (described later). The groove depth h of the U-groove 13 from the end face 11A1 of the lug portion 11A is, as shown in FIG. 8, set to a size about twice the plate thickness t of the urging spring 15 (described later).

The U-groove 13 is disposed at a position radially outer than the center position in the width direction of the lug portion 11A (i.e. in the radial direction of the disk). It should be noted that the lug portion 11B, which is located at the rotation exit side of the disk 1, should preferably have a U-groove 13 configured in the same way as that of the lug portion 11A, which is located at the rotation entrance side. By so doing, the friction pads 10 can use common components for the inner and outer sides of the disk 1, and it is possible to reduce the parts count of the disk brake and to solve the complexity problem in manufacturing.

The arms 2A of the carrier 2 have pad springs 14 attached thereto, respectively. The pad springs 14 each resiliently support the inner and outer friction pads 10 and allow smooth sliding displacement of the friction pads 10. Each pad spring 14 is formed by bending (press forming) a stainless steel plate or the like having spring property, as shown in FIGS. 1 to 6.

Each pad spring 14 is configured to include a pair of guide plate portions 14A, a connecting plate portion 14B, and radially urging plate portions 14C. The pair of guide plate portions 14A are each formed by being bent in a substantially U-shape so as to be fitted into the associated pad guide 4 of the carrier 2. The guide plate portions 14A are spaced apart from each other so as to be disposed at the inner and outer sides, respectively, of the disk 1. The connecting plate portion 14B is formed to extend axially over the outer periphery of the disk 1 to integrally connect together the guide plate portions 14A at the inner and outer sides of the disk 1. The radially urging plate portions 14G are integrally formed with the guide plate portions 14A at the respective inner regions of the latter in the radial direction of the disk 1.

The guide plate portions 14A of the pad springs 14 are, as shown in FIGS. 2, 3, 5 and 6, fitted into and attached to the associated pad guides 4 of the carrier 2 and have a function of guiding the backing plates 11 of the friction pads 10 in the axial direction of the disk 1 through the projection-shaped lug portions 11A and 11B. The radially urging plate portions 14C resiliently abut against the associated lug portions 11A and 11B of the friction pads 10 (backing plates 11) in the pad guides 4 of the carrier 2, thereby urging the backing plates 11 of the friction pads 10 radially outward. Thus, the pad springs 14 suppress the rattling of the friction pads 10.

The urging spring 15 is provided between the lug portion 11A (side surface portion) of the two lug portions 11A and 11B (side surface portions) of the backing plate 11 of each friction pad 10, which is located at the entrance side of the rotational direction of the disk 1 when the vehicle runs forward, and a torque receiving surface 5 of the carrier 2 which faces the lug portion 11A (i.e. an opposing surface of the mounting member). The urging spring 15 constitutes an urging device urging the friction pad 10 toward the rotation exit side of the disk 1.

Figure 9:
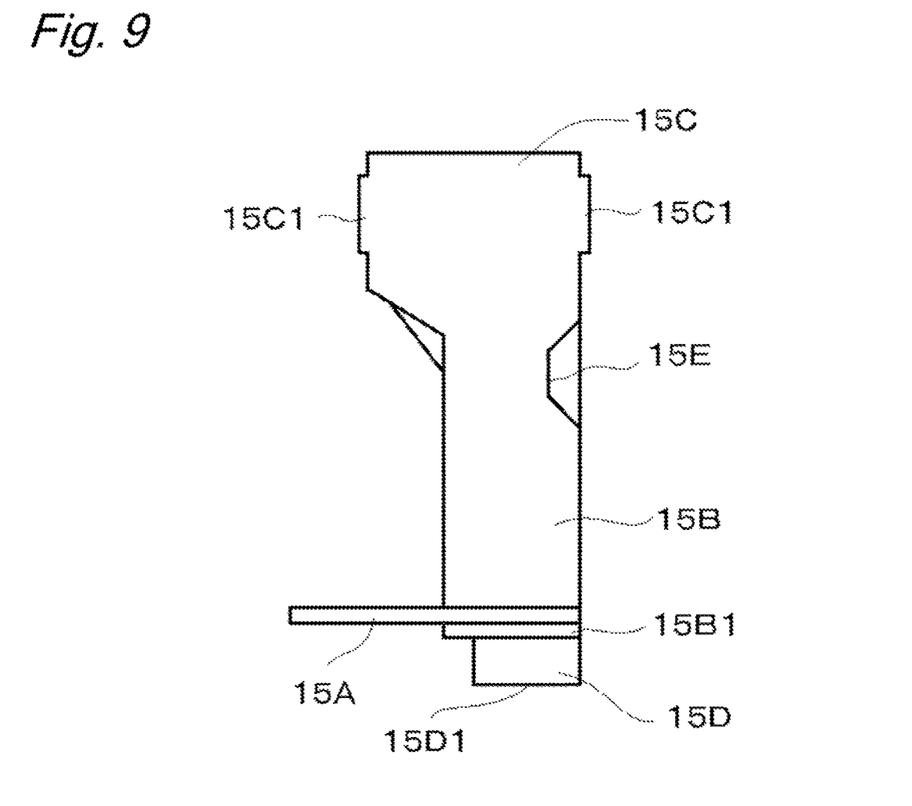
FIG. 9 is a left-hand side view showing only the urging spring in FIG. 8 as seen from the left-hand side.
Figure 10:
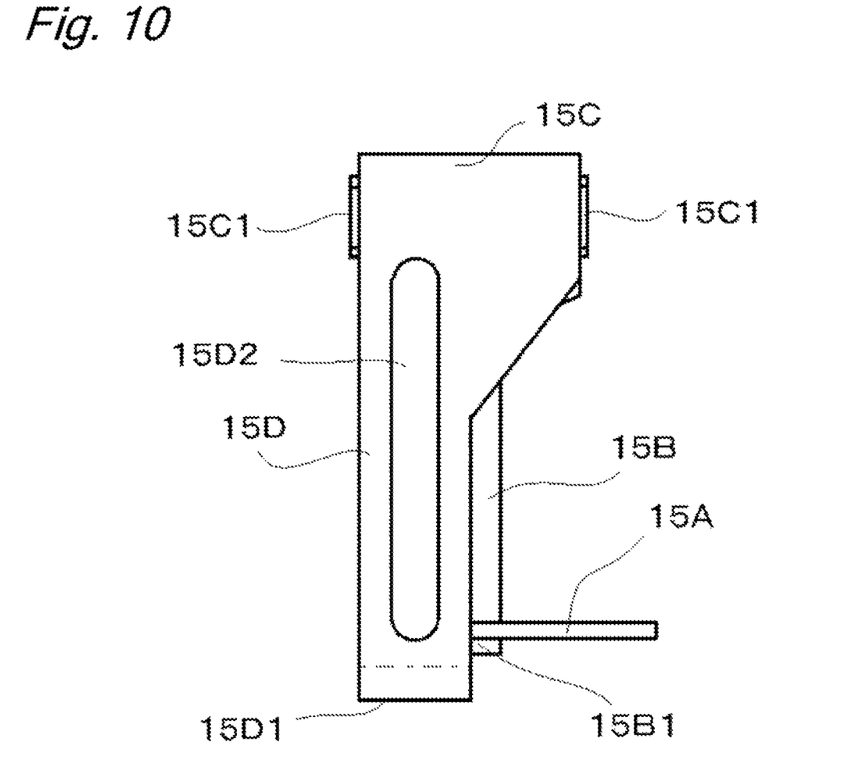
FIG. 10 is a right-hand side view showing only the urging spring in FIG. 8 as seen from the right-hand side.
Figure 11:
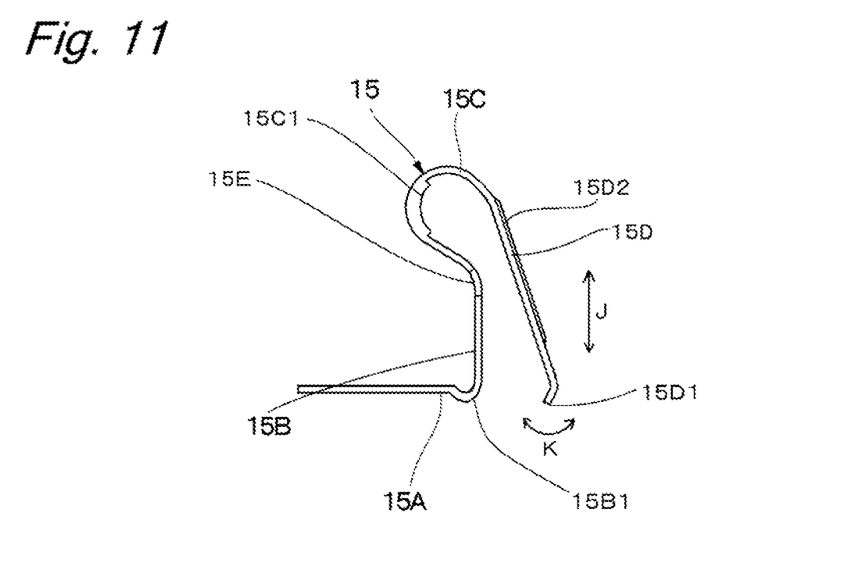
FIG. 11 is a diagram showing only the urging spring in FIG. 8 when in its natural state.

The urging spring 15 is formed by bending (press forming) a stainless steel plate or the like having spring property and a uniform thickness t, for example, as shown in FIGS. 9 to 11. The spring constant k1 of the urging spring 15 is set to satisfy the relationship of the following expression (1):

$$0 < k1 < k \qquad \text{[Expression (1)]}$$

$$k = 4\pi^2 \times f^2 \times m \qquad \text{[Expression (2)]}$$

The spring constant k given by expression (2) is obtained from the mass m of the friction pad 10 and the natural frequency f of the caliper 6 when the caliper 6 as attached to the carrier 2 (mounting member) vibrates as a rigid body, considering the caliper 6 to be a vibration generating source as a cause of brake noise. The spring constant k1 of the urging spring 15 is set to a value less than the spring constant k given by expression (2) and greater than zero by appropriately adjusting the plate thickness t, for example. When the natural frequency f is assumed to be 200 Hz and the mass m is assumed to be 0.2 kg, the spring constant k given by the above expression (2) is obtained as follows:

$$k = 3.16 \times 10^6 \text{ N/m} \qquad \text{[Expression (3)]}$$

It should be noted than the natural frequency f can be determined by a vibration test in which the caliper 6 as attached to both the vehicle and the carrier 2 is excited with a hammer or the like, and vibration generated at this time is measured with a measuring instrument. The natural frequency of the caliper 6 measured by such a vibration test has a range of from 200 to 500 Hz.

The urging spring 15 substantially comprises, as shown in FIGS. 7 to 11, a mounting portion 15A, a first extending portion 15B, a bent portion 15C, a second extending portion 15D, and a boundary region 15E. The mounting portion 15A is attached to the obverse surface 11F side of the friction pad 10 (backing plate 11) by being secured thereto with the caulked portion 11E. The first extending portion 15B is narrower in width than the mounting portion. 15A (the horizontal direction in FIG. 10 is assumed to be a width direction; the vertical, direction in FIG. 10 is assumed to be a longitudinal direction). The first extending portion 15B is connected at its proximal end to (integrally formed with) the mounting portion 15A and extended away from the disk 1 through the U-groove 13 toward the other surface (reverse surface 116) side, i.e. the opposite side to the one surface (obverse surface 11F) side of the backing plate 11. The proximal end of the first extending portion 15B, which is connected to the mounting portion 15A, has a curved portion 15B1 that extends a little toward the disk 1 before extending away therefrom. The boundary region 15E forms a boundary between the first extending portion 15B and the bent portion 15C. The boundary region 15E is a narrow-width portion narrower in width than the first extending portion 15B to reduce the stiffness in the bending direction. The width of the boundary region 15E is equal to or less than that of the second extending portion 15D. The bent portion 15C is integrally formed with the distal end of the first extending portion 15B. The bent portion 15C is bent in the shape of an arc that is convex away from the disk 1 at the reverse surface 11G side of the backing plate 1, and turned back so that the distal end of the bent portion 15C faces toward the disk 1. The bent portion 15C is wider in width than the first and second extending portions 15B and 15D to enhance the stiffness in the direction in which the curvature of the arcuate configuration changes. In addition, both sides in the width direction of the bent portion 15C are bent at 90 degrees along the longitudinal direction to form reinforcing portions 15C1 to further enhance the stiffness in the direction in which the arcuate curvature changes. Consequently, the bent portion 15C is higher in stiffness than the other portions. It should, however, be noted that the reinforcing portions 15C1 may be omitted, or a reinforcing portion 15C1 may be provided only at one side in the width direction, or the bending angle of the reinforcing portions 15C1 may be more or less than 90 degrees, as necessary. That is, the stiffness in the direction in which the arcuate curvature of the bent portion 15C changes can be enhanced by turning back the urging spring 15 as stated above; therefore, the stiffness can be set appropriately. The second extending portion 15D extends in a direction toward the disk 1 from the distal end of the bent portion 15C, i.e. toward the obverse surface 11F side of the backing plate 11, and abuts (resiliently abuts) against the torque receiving surface 5 of the carrier 2 through the associated guide plate portion 14A of the pad spring 14 in an elastically deformed state. The distal end of the second extending portion 15D constitutes an abutment portion 15D1 that contacts the disk 1 when the lining 12 has worn. The abutment portion 15D1 has its distal end bent in the direction A, in which the disk 1 rotates when the vehicle runs forward. The width of the second extending portion 15D is narrower than that of the bent portion 15C and substantially equal to that of the first extending portion 15B. The second extending portion 15D has a longitudinally extending rib 15D2 formed by pressing to enhance the stiffness in the bending direction.

The urging spring 15 is secured at the mounting portion 15A to the lug portion 11A of the backing plate 11, whereby the urging spring 15 is supported by the friction pad 10 in a cantilever fashion as shown in FIG. 8 both when the brake is not activated and when the brake is activated during forward running of the vehicle. When the brake is activated daring reverse running of the vehicle, even if the urging spring 15 is flexurally deformed considerably by the abutment of the lug portion 11A of the friction pad 10 (backing plate 11) against, the torque receiving surface 5 of the carrier 2 (through the guide plate portion 14A of the pad spring 14), the second extending portion 15D is accommodated in the U-groove 13 of the lug portion 11A, together with the first extending portion 15B, thereby allowing the urging spring 15 to be still supported in the cantilever fashion.

Further, the urging spring 15 is, as shown also in FIG. 7, disposed at a position radially outer than the center position in the width, direction of the lug portion 11A (i.e. the radial direction of the disk). Consequently, the urging spring 15 can urge the friction pad 10 toward the disk rotation exit side at a position radially outer than the center position in the width direction of the lug portion 11A. Therefore, it is possible to suppress the occurrence of couple force escaping during braking.

The following is an explanation of the operation of the disk brake according to the embodiment configured as stated above.

First, when the brake of the vehicle is activated, a brake fluid pressure is supplied into the inner leg portion 6A (cylinder) of the caliper 6, thereby causing the piston to be slidingly displaced toward the disk 1, whereby the inner friction pad 10 is pressed against one side of the disk 1. At this time, the caliper 6 receives pressing counterforce from the disk 1. Therefore, the whole caliper 6 is slidingly displaced toward the inner side relative to the arms 2A of the carrier 2. Consequently, the outer leg portion 6C presses the outer friction pad 10 against the other side of the disk 1.

Thus, the inner and outer friction pads 10 can strongly hold the disk 1 rotating in the direction of the arrow A in FIGS. 1 to 3 (when the vehicle is running forward) therebetween from both sides in the axial direction of the disk 1, thereby applying braking force to the disk 1. When the braking operation is canceled, the supply of the fluid pressure to the piston is stopped. Consequently, the inner and outer friction pads 10 separate from the disk 1 and return to their non-braking positions.

Both when the brake is activated and when the braking operation is canceled (i.e. when the brake is not activated) as stated above, the one of the lug portions 11A and 11B of each friction pad 10 that is located at the rotation entrance side of the disk 1, i.e. the lug portion 11A, is urged in the direction of the arrow C in FIGS. 2, 3, 5 and 6 by the urging spring 15. Thus, the friction pad 10 is constantly urged toward the rotation exit side of the disk 1 (in the arrow A direction in FIG. 2) with a weak force. The lug portion 11B, which is located at the rotation exit side of the disk 1, is resiliently pressed against the torque receiving surface 5 of the pad guide 4 through the guide plate portion 14A of the pad spring 14 with the urging force of the urging spring 15.

Accordingly, the friction pad 10 can be restrained from rattling in the circumferential direction of the disk 1 owing to vibration or the like during the running of the vehicle by the urging spring 15 provided between one lug portion 11A, which is located at the disk rotation entrance side, and the associated torque receiving surface 5. During the braking operation when the vehicle is running forward, braking torque (rotational torque in the direction of the arrow A) that the friction pad 10 receives from the disk 1 can be borne by the rotation exit-side arm 2A (torque receiving surface 5 of the pad guide 4).

Thus, the lug portion 11B of the friction pad 10, which is located at the disk rotation exit side, continues to abut against the torque receiving surface 5 of the pad guide 4 through the guide plate portion 14A. Moreover, the rotation exit-side lug portion 11B has been abutted against the guide plate portion 14A by the action of the urging spring 15 before the braking operation; therefore, there is no clearance between the lug portion 11B and the guide plate portion 14A. Accordingly, there is no possibility of generation of an abnormal noise which would otherwise be induced by the movement of the friction pad 10 caused by braking torque.

The lug portions 11A and 11B of the friction pad 10 are slidably fitted in the pad guides 4 that are located at the rotation entrance and exit sides, respectively, of the disk 1, with the guide plate portions 14A of the pad springs 14 interposed therebetween, and urged outward in the radial direction of the disk 1 by the radially urging plate portions 14C, respectively. Accordingly, the lug portions 11A and 11B of the friction pad 10 can be resiliently pressed against the disk radially outer (upper in the figures) surfaces of the guide plate portions 14A, respectively.

Accordingly, the friction pad 10 can be restrained from rattling in the radial direction of the disk 1 owing to vibration or the like during running of the vehicle by the radially urging plate portions 14C of the pad springs 14. During the braking operation, the inner and outer friction pads 10 can be smoothly guided in the axial direction of the disk 1 along the guide plate portions 14A, with the lug portions 11A and 11B of the friction pads 10 kept in sliding contact with the upper surfaces of the guide plate portions 14A.

Incidentally, it is demanded to take measures to suppress generation of brake noise during slow braking for disk brakes of the type (telescopic type) in which the lug portions 11A and 11B of the friction pad 10 (backing plate 11) are slidably fitted in the pad guides 4, respectively, of the carrier 2. In the present state of art, the problem of brake noise is dealt with only by taking temporary measures, e.g. applying grease or double-sided adhesive tape to the torque receiving surfaces 5 of the carrier 2.

Under these circumstances, the present inventors conducted exhaustive studies on the measures for suppressing brake noise during slow braking, and as a result, we found and confirmed that the generation of brake noise can be suppressed by configuring the urging spring 15, which urges the friction pad 10 toward the rotation exit side of the disk 1, so that the spring constant k1 of the urging spring 15 is set to satisfy the relationship of the above expressions (1) and (2). The reason for this is as follows. By setting the spring constant k1 of the urging spring 15 so as to satisfy the relationship of the expressions (1) and (2), the resonant frequency of the friction pad 10 generated by the urging spring 15 can be made different from the natural frequency f of the caliper 6 when the caliper 6 as attached to the carrier 2 (mounting member) vibrates as a rigid body, considering the caliper 6 to be a vibration generating source.

More specifically, when the brake is activated during forward running of the vehicle, the lug portion 11B of the friction pad 10, which is located at the disk rotation exit side, is resiliently pressed against the torque receiving surface 5 of the disk rotation exit-side pad guide 4 (through the guide plate portion 14A of the pad spring 14) by the action of the urging spring 15 provided at the rotation entrance-side lug portion 11A, and in this state, the lug portion 11B receives braking torque from the disk 1 in cooperation with the torque receiving surface 5. Consequently, the friction pad 10 and the disk rotation exit-side arm 2A of the carrier 2 form a single rigid body. Accordingly, the spring constant k2 when the deformation of the arm 2A is considered to be a spring has characteristics along a characteristic curve 16 (k2=2*108 N/m) shown in FIG. 12, for example. It has been confirmed by a vibration test and so forth that, with the above-described characteristics of the spring constant k2, the resonant frequency of the friction pad 10 is quite different from the natural frequency f of the caliper 6; therefore, the generation of brake noise can be suppressed.

When the brake is activated during reverse running (reversing) of the vehicle, the urging spring 15 transmits braking torque to the torque receiving surface 5 in a cantilever manner as shown in FIG. 8 until the lug portion 11A of the friction pad 10 (backing plate 11) abuts against the torque receiving surface 5 of the carrier 2 (through the guide plate portion 14A of the pad spring 14). In this regard, the spring constant k1 of the urging spring 15 is set so as to be smaller than a characteristic curve 17 (spring constant k defined by the above expressions (2) and (3); e.g. k=3.16*105 N/m) shown in FIG. 12, for example, while the braking torque is being transmitted only by the urging spring 15. With this configuration, it is possible to avoid the resonant frequency of the friction pad 10, which leads to brake noise. It should be noted that, in FIG. 12, the degree of slope of each spring characteristic curve represents the spring constant. Further, although the urging spring 15 has an initial set load added thereto at a stage where the friction pad 10 is attached to the carrier 2, the magnitude of the initial set lad does not affect the spring constant of the urging spring 15. Therefore, each characteristic curve extends from the reference point shown in FIG. 12 irrespective of the above-described initial set load.

Figure 12:
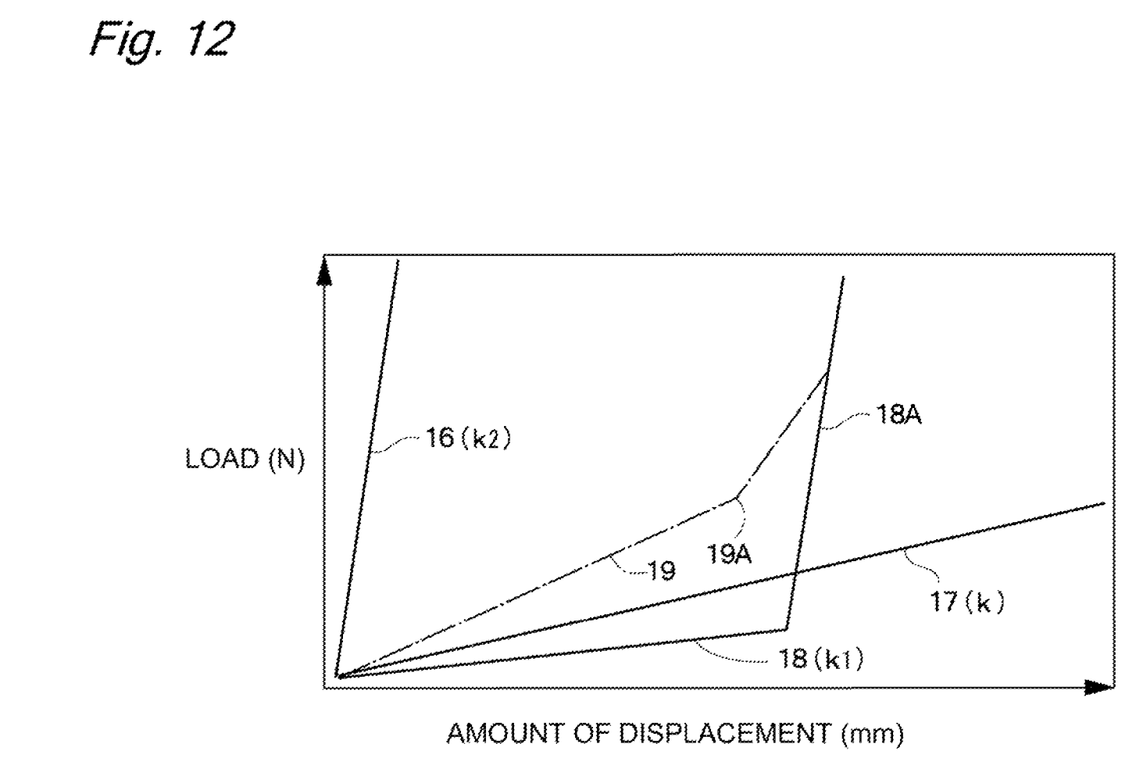
FIG. 12 is a characteristic diagram showing the spring characteristics of urging springs.

Thus, in this embodiment, the spring constant k1 of the urging spring 15 is set to have characteristics along a characteristic curve 18 in FIG. 12 so as to satisfy the relationship (0<k1<k) of the above expression (1), and the spring constant k1 of the urging spring 15 is kept reduced to about k1=7.2*104 N/m, for example, while the braking torque is being transmitted only by the urging spring 15. It should be noted that, in FIG. 12, a characteristic curve 19 shown by the one-dot chain line represents the spring constant characteristics of the anti-rattle spring in Patent Literature 1. The section of the characteristic curve 19 before the inflection point 19A shows the spring characteristics or the spring as supported in a cantilever manner. Before the inflection point 19A, the spring constant of the characteristic curve 19 is larger than the spring constant k. Accordingly, there is a possibility that the friction pad may resonate with the caliper that vibrates at the above-described natural frequency f, causing brake noise. The section of the characteristic curve 19 after the inflection point 19A shows the spring characteristics of the spring as supported in a double-support manner. The spring constant after the inflection point 19A is larger than when the spring is supported in the cantilever manner. The spring constant of the spring as supported in the double-support manner is also larger than the above-described spring constant k. Accordingly, there is also a possibility that the friction pad may resonate with the caliper that vibrates at the natural frequency f, causing brake noise.

Further, because the spring constant k1 of the urging spring 15 is set to be relatively small, immediately after the brake has been activated, the lug portion 11A of the friction pad 10 (backing plate 11) abuts against the torque receiving surface 5 of the carrier 2 (through the guide plate portion 14A of the pad spring 14) to receive the braking torque from the disk 1 in cooperation with the torque receiving surface 5. Even when the urging spring 15 is flexurally deformed considerably, as shown in FIG. 10, by the abutment of the lug portion 11A against the torque receiving surface 5, the urging spring 15 is still supported in the cantilever fashion. Accordingly, the apparent spring constant k1 of the urging spring 15 rises as shown by a section 18A of the characteristic curve 18, shown in FIG. 12, and thus shows a characteristic curve substantially parallel to the characteristic curve (16 shown in FIG. 12) of the combined spring constant k2 of the arm 2A of the carrier 2 and the urging spring 15. Therefore, it is possible to avoid the resonant frequency of the friction pad 10 generated by the urging spring 15, which leads to generation of noise, and it is possible to suppress generation of brake noise, including slow braking noise. Slow braking noise, particularly brake noise in a low-frequency range, is likely to occur in a disk brake attached to a rear wheel of a vehicle; therefore, it is an effective way to attach the urging spring 15 of this embodiment ho a rear-side disk brake. Provided that the urging spring 15 has the spring constant k1, it is even possible to avoid the resonant frequency of the friction pad 10 with respect to the natural frequency (about 2,000 Hz) of the 3 nodal diameter mode of the disk 1 when the disk 1 is considered to be a vibration generating source, and hence possible to suppress the generation of brake noise. Thus, the generation of brake noise caused by other vibration generating sources can also be suppressed by setting the spring constant k1 of the urging spring 15 smaller than the spring constant k obtained from the mass m of the friction pad and the natural frequency f of the caliper 6 when the caliper 6 as attached to the carrier 2 (mounting member) vibrates as a rigid body.

Further, in this embodiment, the urging spring 15 is formed as a one-piece member comprising a mounting portion 15A, a first extending portion 15B, a bent portion 15C, and a second extending portion 15D, as stated above, by bending a metal plate having spring property (e.g. a stainless steel plate). Therefore, the spring constant k1 of the urging spring 15 can be set so as to satisfy the relationship of the above expression (1) by appropriately adjusting the plate thickness t of the urging spring 15.

Figure 5:
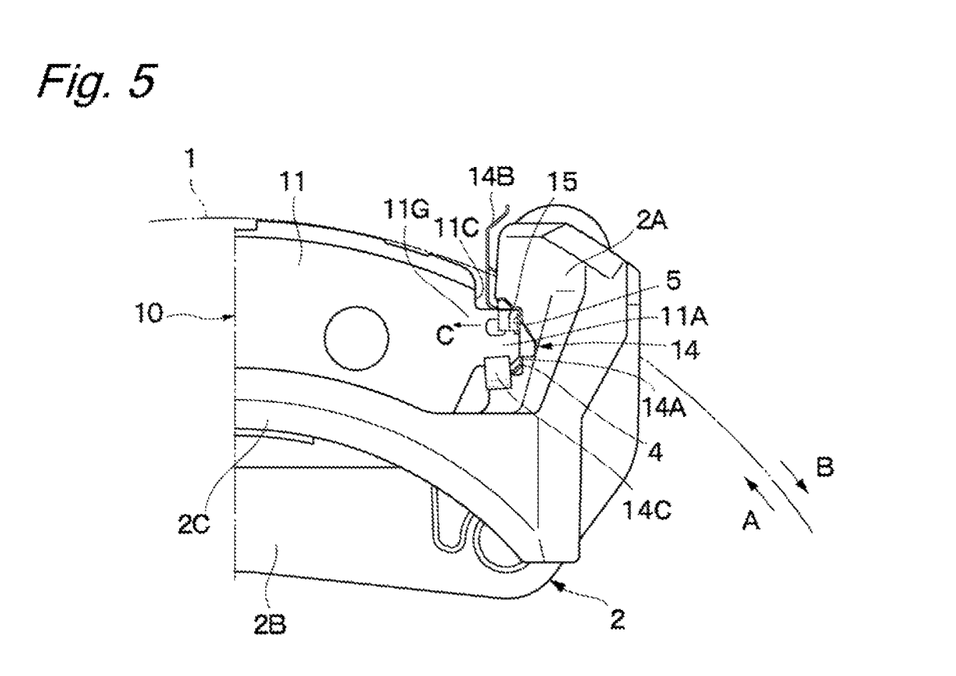
FIG. 5 is a front view of the mounting member, one friction pad, one pad spring, one urging spring, etc. shown in FIG. 4.

Further, the urging spring 15 is, as shown also in FIGS. 5 to 7, disposed at a position radially outer than the center position in the width direction of the lug portion 11A (i.e. in the radial direction of the disk). Consequently, the urging spring 15 can urge the friction pad 10 in a direction in which the moment caused by the braking torque is positive, at a position radially outer than the center position in the width direction of the lug portion 11A, and it is possible to suppress the occurrence of a couple force escaping.

Further, the urging spring 15 can be disposed in a compact form between the lug portion 11A of the two lug portions 11A and 11B of the friction pad 10 (backing plate 11), which is located at the entrance side of the rotational direction of the disk when the vehicle runs forward, and the torque receiving surface 5 of the carrier 2 that faces the lug portion 11A. In addition, the second extending portion 15D of the urging spring 15 is configured so that the urging spring 15 is still supported in a cantilever fashion even when the end face 11A1 of the lug portion 11A abuts against the torque receiving surface 5 (through the guide plate portion 14A) during reversing of the vehicle. Therefore, the spring constant k1 of the urging spring 15 can be easily set to a small value as given by the above expressions (1) to (3), and it is possible to suppress the generation of an abnormal noise, e.g. brake noise, during braking when the vehicle is running in the backward direction.

Because the urging spring 15 is provided at the obverse surface 11F side of the backing plate 11 of the friction pad 10, where the lining 12 is provided, the vehicle space can be used effectively, and it is easy to ensure the necessary spring constant and necessary load (spring force) for the urging spring 15. Because the urging spring 15 is provided, being secured to the backing plate 11 of the friction pad 10, the urging spring 15 and the friction pad 10 can be attached to the carrier 2 in the form of a subassembly in which the urging spring 15 has been previously assembled to the friction pad 10. Thus, it is possible to improve operability during assembling.

Particularly, in this embodiment, the urging spring 15 comprises a mounting portion 15A secured to the obverse surface 11F side of the backing plate 11, a first extending portion 15B extended from the distal end of the mounting portion 15A away from the disk 1 toward the reverse surface 11G side of the backing plate 11, a bent portion 15C formed at the distal end of the first extending portion 15B and arcuately bent toward the disk 1 at the reverse surface 11G side of the backing plate 11, and a second extending portion 15D extending in a direction toward the disk 1 from the distal end of the bent portion 15C to abut against the torque receiving surface 5 side of the carrier 2 in an elastically deformed state.

Accordingly, the spring length of the urging spring 15 can be set to a sufficient length by the mounting portion 15A, the first extending portion 15B, the bent portion 15C, and the second extending portion 15D, and the spring constant required for the urging spring 15 (i.e. the spring constant given by the above expressions (1) and (2)) can be ensured easily. Consequently, it becomes easy to ensure the required load (spring force) for the urging spring 15, and it is possible to effectively use the vehicle space, with the urging spring 15 attached to the friction pad 10.

Further, with the urging spring 15 formed by using a stainless steel plate, for example, the second extending portion 15D, which is located at the distal end (free end) of the urging spring 15, resiliently abuts against the torque receiving surface 5 of the carrier 2 through the guide plate portion 14A of the pad spring 14 in an elastically deformed state. Accordingly, it is possible to attain a smooth sliding contact between the second extending portion 15D and the torque receiving surface 5 and hence possible to suppress the occurrence of brake judder or the like satisfactorily.

Further, the bent portion 15C of the urging spring 15 is arcuately bent at an inner side of the disk circumferential direction (arrow C direction) than the end face 11A1 of the lug portion 11A of the backing plate 11, as shown also in FIG. 8, for example. Therefore, the bent portion 15C and so forth of the urging spring 15 can be easily disposed by effectively using a space formed by the pad guide 4 of the carrier 2. Moreover, the spring length of the urging spring 15 can be ensured sufficiently owing to the configuration of the urging spring 15, and the urging force (spring force) can be stabilized.

Further, because the distal end of the urging spring 15 is used as an abutment portion 15D1, the urging spring 15, which is a single component, can be used also as a wear detection sensor detecting wear of the lining 12, and the parts count can be reduced.

The inventors of the present invention conducted studies to enhance the frictional sound produced when using the urging spring 15 as a wear detection sensor, and as a result, obtained the knowledge that the self-excited vibration of the urging spring 15 can be made more likely to occur and the wear detection sound can be enhanced by bringing closer to each other the natural frequency ωr in the rotational direction K and the natural frequency ωt in the vertical direction J, which are shown in FIG. 11.

Figure 13:
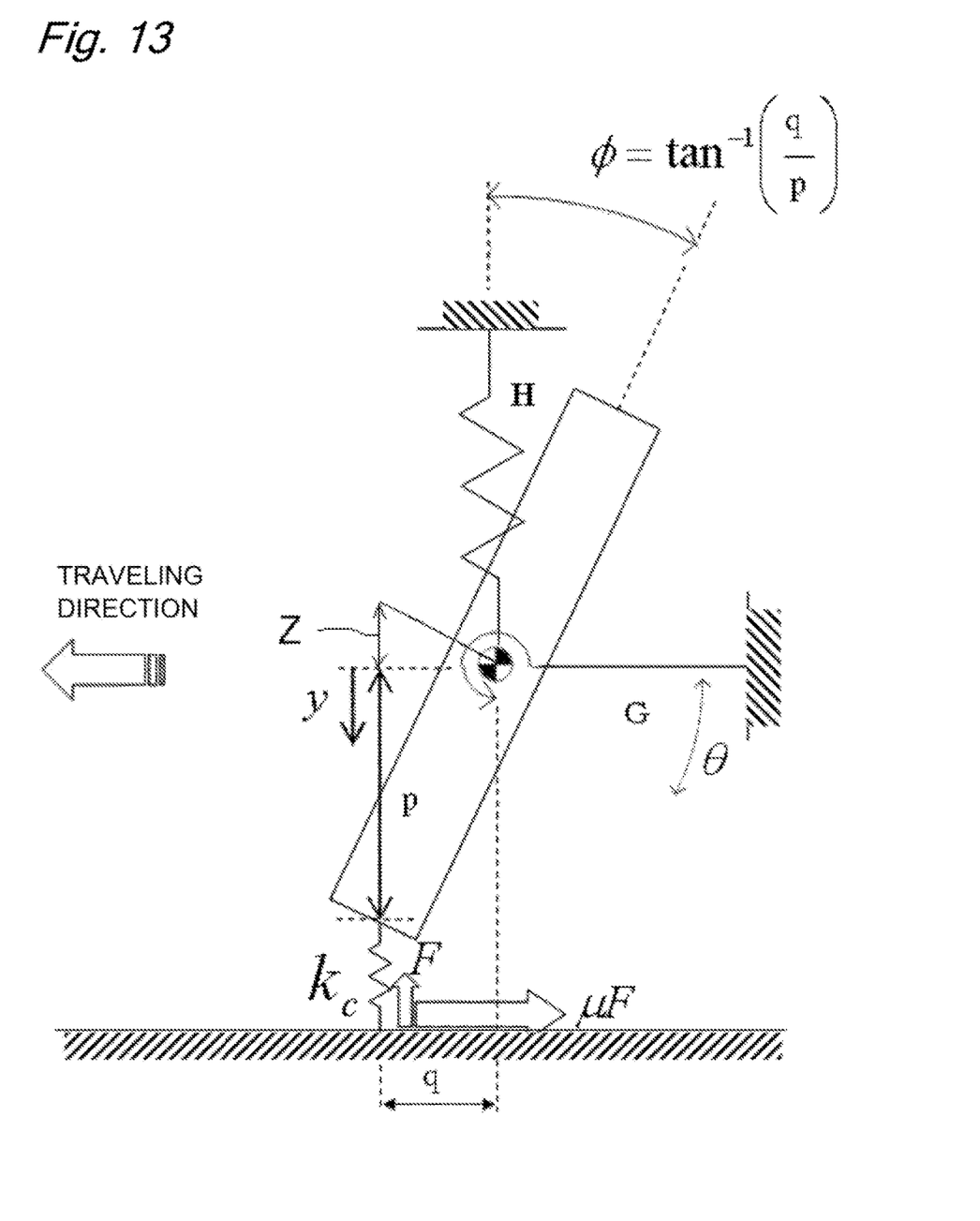
FIG. 13 is a principle diagram showing the self-excited vibration of a wear detection sensor.

We tested the vibration mechanism of the wear detection sensor by using a self-excited vibration model which is a two-degree-of-freedom model as shown in FIG. 13, as follows. FIG. 13 shows a motion model of a rigid rod traveling on a friction surface. This model takes into account the vertical translation freedom and the degree of freedom of rotation about the center of gravity when a simple rod of a rigid body travels on a plate. The following is a description of the self-excited vibration generation mechanism of a simple rod on a friction surface.

The symbols denote as follows:

M: the mass of the simple rod; D: the moment of inertia of the simple rod; H: the support stiffness of the simple rod in the translational direction; G: the support stiffness of the simple rod in the rotational direction; kc: the stiffness of contact between the simple rod and the friction surface; μ: the coefficient of friction between the simple rod and the friction surface; F: the normal force normal to the friction surface; p: the distance in the vertical direction from the gravity center position to the point of contact; q: the distance in the traveling direction from the gravity center position to the point of contact; φ: the slope of the simple rod; y: the displacement of the simple rod in the vertical direction; θ: the angle of rotation of the simple rod. The equations of motion in the translational and rotational directions are as follows:

$$M\ddot{y} + Hy = -F$$

$$D\ddot{\theta} + G\theta = (q - \mu p)F \qquad \text{[Expression (4)]}$$

$$F = k_c(y - q\theta) \qquad \text{[Expression (5)]}$$

Expression (5) may be obtained as follows: Reaction force from the friction surface can be obtained by multiplying the contact stiffness kc by the amount of displacement according to Hooke's law. Considering translation, the simple rod is displaced by y; therefore, kc×y is the spring force by the translational motion. Next, considering rotation, if the simple rod is assumed to rotate through θ about the gravity center position (clockwise is positive), the simple rod is displaced in the rise direction. In other words, the spring is extended by an amount corresponding to the line segment Z. The length of the line segment Z is given by q×tan θ≈qθ. The translational motion causes the spring to be compressed, and the rotational, motion causes the spring to be extended; therefore, the amount of displacement is given by y−aθ. Accordingly, the normal force (reaction force) F is determined as given by expression (5).

The right-hand side of the rotational motion equation (lower equation of expression (4)) represents the moment about the gravity center point determined by the reaction force F from the friction surface and the frictional force μF.

This may be rearranged as follow:

$$\begin{pmatrix} M & 0 \\ 0 & D \end{pmatrix}\begin{pmatrix} \ddot{y} \\ \ddot{\theta} \end{pmatrix} + \begin{pmatrix} (k+k_a) & -qk_c \\ -(q-\mu l)k_c & K+k_cq(q-\mu p) \end{pmatrix}\begin{pmatrix} y \\ \theta \end{pmatrix} = \begin{pmatrix} 0 \\ 0 \end{pmatrix} \quad \text{[Expression (6)]}$$

Conditions under which unstable vibration (self-excited vibration) occurs in a two-degree-of-freedom model are the following two:

(1) The natural frequency ωt in the translational direction and the natural frequency ωr in the rotational direction are coincident with each other.

(2) The product of the non-diagonal elements of the restoring term is negative.

Accordingly, in this subject, self-excited vibration occurs when the following conditions are satisfied:

$$\omega_t = \omega_r \quad \text{[Expression (7)]}$$

$$\omega_t = \sqrt{\frac{k+k_c}{M}}$$

$$\omega_r = \sqrt{\frac{K+k_cq(q-\mu i)}{D}}$$

$$-qk_c \cdot (-(q-\mu p)k_c) = qk_c \cdot (q-\mu p)k_c < 0 \quad \text{[Expression (8)]}$$

$$q(q-\mu p) < 0$$

That is, from expression (7), the following may be understood. When the simple rod and the friction surface are separate from each other, kc may be regarded as zero; therefore, ωt is √(H/M), when the simple rod and the friction surface are in contact with each other, ωt increases as the contact stiffness increases. Regarding ωr, when the simple rod and the friction surface are separate from each other, kc is zero as in the case of the above; therefore, ωr is √(G/D). When the simple rod and the friction surface are in contact with each other, ωr decreases as the contact stiffness increases, according to the condition given by expression (8). That is, it is required, in order to generate self-excited vibration that the separation frequency should be set small in advance so that, before the simple rod and the friction surface come in contact (fractional contact) with each other, the natural frequency ωt of the degree of freedom of translation is lower than the natural frequency ωr of the degree of freedom of rotation (non-contact state: ωt<ωr), and that, after the simple rod and the friction surface have come in contact with each other, the two natural frequencies coincide with each other at an early stage.

Now, let us consider a general urging spring comprising a mounting portion secured to the backing plate, a bent portion connected at its proximal end to the mounting portion and extended arcuately away from the disk before being bent so that the distal end thereof faces toward the disk, and a second extending portion extending in a direction toward the disk from the distal end of the bent portion to resiliently abut against the mounting member in an elastically deformed state. If the urging spring is made by cutting a planar blank out of a metal plate of uniform thickness by a cutting process using a press, a laser, or the like, and plastically deforming the blank, the natural frequency ωt in the vertical direction J becomes lower than the natural frequency ωr in the rotational direction K. Therefore, the natural frequency ωr in the rotational direction K is lowered, or the natural frequency ωt in the vertical direction J is raised, whereby the two natural frequencies can be brought close to each other. The arrangement may also be such that the natural frequency ωr in the rotational direction K is lowered, and the natural frequency ωt in the vertical direction J is raised.

Therefore, in the above-described embodiment, the natural frequency ωr in the rotational direction K is lowered by reducing the stiffness of the boundary region 15E, which has the most influence on the stiffness in the rotational direction K. Accordingly, the width of the boundary region 15E is reduced to thereby reduce the stiffness. It should be noted that the stiffness may be reduced by reducing the plate thickness of the boundary region 15E, although this causes an increase in the number of man-hours to produce the urging spring.

Further, in the above-described embodiment, the natural frequency ωt in the rotational direction K is raised by increasing the stiffness of the bent portion 15C, which has the most influence on the stiffness in the translational direction J. Accordingly, the width of the bent portion 15C is increased to thereby increase the stiffness. In addition, both sides in the width direction of the bent portion 15C are bent at 90 degrees along the longitudinal direction to form reinforcing portions 15C1, thereby further enhancing the stiffness in the direction in which the arcuate curvature changes. It should be noted that, to increase the stiffness of the bent portion 15C, the bent portion 15C may be provided with a rib like the rib 15D2 or may be increased in wall thickness.

It should be noted that, in the above-described embodiment, the urging spring 15 is configured such that the proximal end of the urging spring 15 is secured to the lug portion 11A of the backing plate 11, and the distal end (extending portion 15D) of the urging spring 15 is resiliently abutted against the torque receiving surface 5 of the carrier 2. However, the present invention is not limited thereto. For example, the arrangement may foe such that a pad spring is integrally provided with an urging spring (urging device), and the distal end (extending portion) of the urging spring is resiliently abutted against a torque transmission portion (lug portion) of a friction pad. In this case also, the urging spring can be disposed in a compact form between the lug portion 11A of the friction pad 10 (backing plate 11) and the torque receiving surface 5 of the carrier 2.

Further, in the above-described embodiment, the present invention has been described by way of an example in which recess-shaped pad guides 4 are formed on the arms 2A of the carrier 2, and lug portions 11A and 11B, which serve as fitting portions of the backing plate 11, are formed in the shape of projections. However, the present invention is not limited thereto. For example, the arrangement may be such that recess-shaped fitting portions are provided on the backing plate of the friction pad, and projection-shaped pad guides are provided on the arms of the mounting member.

Further, in the above-described embodiment, the present invention has been described by way of an example in which a torque receiving surface 5 serving as a torque receiving portion is formed by the inner wall surface of a pad guide 4 comprising a U-shaped groove. However, the present invention is not limited thereto but applicable also to a disk brake configured such that a torque receiving surface serving as a torque receiving portion is provided at a position separate from the pad guide (at a position different from that of the pad guide), for example.

The following is a description of inventions included in the foregoing embodiment. The urging device is provided between the torque receiving surface of the mounting member and the one of the torque transmission portions of the friction pad that is located at the entrance side of the rotational direction of the disk when the vehicle runs forward to urge the friction pad toward the exit side of the rotational direction of the disk with an extending portion that resiliently abuts against either one of the torque transmission portion and the torque receiving surface.

With the above-described structure, the urging device can be disposed in a compact form between the torque receiving surface of the mounting member and the one of the torque transmission portions of the friction pad that is located at the entrance side of the rotational direction of the disk when the vehicle runs forward, and it is possible to stabilize urging force urging the friction pad toward the exit side of the rotational direction of the disk.

In addition, the extending portion of the urging device is formed so that the cantilever state is maintained until the torque transmission portion abuts against the torque receiving surface of the mounting member during reverse running of the vehicle. Thus, the spring constant of the urging device can be easily set to a smaller value, and it is possible to reduce the generation of an abnormal noise, e.g. brake noise, during braking when the vehicle is running in the backward direction.

In addition, the urging device is provided, being secured to the backing plate of the friction pad. With this structure, the urging device and the friction pad can be attached to the mounting member in the form of a subassembly in which the urging device has been previously assembled to the friction pad. Thus, it is possible to improve operability during assembling.

In addition, the urging device is provided, being secured to one surface side of the backing plate of the friction pad where the lining is provided. With this structure, it becomes easy to ensure the necessary spring constant and necessary load (spring force) for the urging device, and the limited vehicle space can be used effectively.

Meanwhile, the urging device is configured to have a mounting portion secured to one surface side of a backing plate, a first extending portion connected at its proximal end to the mounting portion and extended away from the disk toward the other surface side of the backing plate, which is opposite to the one surface side of the backing plate, a bent portion formed at the distal end of the first extending portion and arcuately bent toward the disk at the other surface side of the backing plate, and a second extending portion extending from the distal end of the bent portion toward the disk and resiliently abutting against the mounting member in an elastically deformed state.

With the above-described structure, the spring length of the urging device can be ensured sufficiently by the first extending portion, the bent portion, and the second extending portion, and the spring constant required for the urging device can be ensured easily. In addition, it becomes easy to ensure the required load (spring force), and it is possible to effectively use the limited vehicle space.

In addition, the bent portion of the urging device is arcuately bent at an inner side of the disk circumferential direction than an end face of a torque transmission portion of the backing plate that faces the torque receiving surface of the mounting member. With this structure, the urging device can be formed with a sufficient spring length, so that the urging force (spring force) can be stabilized. Moreover, the limited vehicle space can be used effectively.

Meanwhile, the urging device is configured to be secured to the other surface side of the backing plate of the friction pad, which is opposite to the side where the lining is provided. With this structure, the urging device can be provided, being secured to the other surface side of the backing plate, and it is possible to increase the area occupied by the lining, which is provided on the one surface side of the backing plate.

In addition, the urging device is configured to be formed on a pad spring provided on the mounting member. With this structure, the urging device can be formed integrally with the pad spring. Consequently, the parts count can be reduced, and operability during mounting can be improved.

REFERENCE SIGNS LIST

1: disk; 2: carrier (mounting member); 2A: arm; 5: torque receiving surface; 6: caliper; 7: sliding pin; 10: friction pad; 11: backing plate; 12: lining (friction material); 13: U-groove; 14: pad spring; 15: urging spring (urging device); 15A: mounting portion; 15B: first extending portion; 15C: bent portion; 15D: second extending portion; 15E: boundary region.

The invention claimed is:

1. A disk brake comprising:
a mounting member secured to a vehicle, extending over a disk, the mounting member having torque receiving surfaces receiving torque during a braking operation, the mounting member having a caliper provided thereon slidably in an axial direction of the disk, the caliper being configured to press friction pads against the disk, the friction pads being provided to face both sides, respectively, of the disk;
the friction pads each having a backing plate supported by the mounting member at both sides thereof in a circumferential direction of the disk, the backing plate having torque transmission portions on side portions thereof that abut against the torque receiving surfaces, respectively, of the mounting member, the friction pads each further having a friction material fixed to one surface side of the backing plate, the friction material being abuttable against the disk to generate frictional force, and an urging device urging the friction pad toward an exit side of a rotational direction of the disk;
the urging device having:
a mounting portion secured to the backing plate;
a first extending portion connected at a proximal end thereof to the mounting portion and extended away from the disk;

a bent portion connected to a distal end of the first extending portion, extending so as to incline toward a center side of the friction pad and then formed arcuately away from the disk and bent so that a distal end of the bent portion faces toward the disk;

a second extending portion extending from the distal end of the bent portion toward the disk and resiliently abutting against the mounting member in an elastically deformed state; and a boundary region formed between the first extending portion and the bent portion, and formed so as to bend away from the disk toward the center side of the friction pad, wherein a distal end of the second extending portion abuts against the disk when the friction material has worn by a predetermined amount; and wherein at least one side in a width direction of the bent portion has an edge portion that is additionally bent along a longitudinal direction to form a reinforcing portion to further enhance a stiffness in a direction in which the bent portion is formed arcuately away from the disk;

the bent portion being set higher in stiffness than the boundary region.

2. The disk brake of claim 1, wherein the boundary region is set lower in stiffness than the first extending portion, and the bent portion is set higher in stiffness than the first extending portion.

3. The disk brake of claim 1, wherein the urging device comprises a metal plate;

the boundary region being a narrow-width portion narrower in width than the first extending portion.

4. The disk brake of claim 1, wherein the urging device comprises a metal plate;

the bent portion being a wide-width portion wider in width than the first extending portion.

5. The disk brake of claim 4, wherein the urging device comprises a metal plate.

* * * * *